United States Patent
Putzien et al.

(10) Patent No.: US 10,899,866 B2
(45) Date of Patent: Jan. 26, 2021

(54) PROCESS FOR PRODUCING A RING-OPENING POLYMERIZATION PRODUCT

(71) Applicant: Construction Research & Technology, GmbH, Trostberg (DE)

(72) Inventors: Sophie Putzien, Ampfing (DE); Maximilian Köhler, Trostberg (DE); Heimo Woelfle, Traunstein (DE)

(73) Assignee: Construction Research & Technology GmbH, Trostberg (DE)

( * ) Notice: Subject to any disclaimer, the term of this patent is extended or adjusted under 35 U.S.C. 154(b) by 7 days.

(21) Appl. No.: 15/744,899

(22) PCT Filed: Aug. 1, 2016

(86) PCT No.: PCT/EP2016/068267
§ 371 (c)(1),
(2) Date: Jan. 15, 2018

(87) PCT Pub. No.: WO2017/025365
PCT Pub. Date: Feb. 16, 2017

(65) Prior Publication Data
US 2018/0208705 A1    Jul. 26, 2018

(30) Foreign Application Priority Data
Aug. 10, 2015   (EP) .................................. 15180420

(51) Int. Cl.
| | | |
|---|---|---|
| *C08G 18/28* | (2006.01) | |
| *C08G 18/48* | (2006.01) | |
| *C08G 18/75* | (2006.01) | |
| *C08G 18/80* | (2006.01) | |
| *C08G 18/10* | (2006.01) | |
| *C08G 18/20* | (2006.01) | |
| *C08G 18/24* | (2006.01) | |
| *C08G 18/73* | (2006.01) | |
| *C08G 18/79* | (2006.01) | |
| *C08G 18/76* | (2006.01) | |
| *C08G 18/71* | (2006.01) | |
| *C08G 101/00* | (2006.01) | |

(52) U.S. Cl.
CPC .......... *C08G 18/281* (2013.01); *C08G 18/10* (2013.01); *C08G 18/20* (2013.01); *C08G 18/2018* (2013.01); *C08G 18/2063* (2013.01); *C08G 18/246* (2013.01); *C08G 18/48* (2013.01); *C08G 18/4829* (2013.01); *C08G 18/714* (2013.01); *C08G 18/73* (2013.01); *C08G 18/75* (2013.01); *C08G 18/755* (2013.01); *C08G 18/76* (2013.01); *C08G 18/7621* (2013.01); *C08G 18/79* (2013.01); *C08G 18/792* (2013.01); *C08G 18/80* (2013.01); *C08G 18/8061* (2013.01); *C08G 2101/0008* (2013.01)

(58) Field of Classification Search
CPC ............. C08G 18/281; C08G 18/4829; C08G 18/246; C08G 18/2063; C08G 18/2018; C08G 18/10; C08G 18/8061; C08G 18/792; C08G 18/7621; C08G 18/755; C08G 18/73; C08G 18/714; C08G 2101/0008; C08G 18/48; C08G 18/75; C08G 18/76; C08G 18/79; C08G 18/80; C08G 18/20
See application file for complete search history.

(56) References Cited

U.S. PATENT DOCUMENTS

| | | |
|---|---|---|
| 5,112,879 A | 5/1992 | Randall et al. |
| 5,132,040 A | 7/1992 | Randall et al. |
| 7,968,572 B2 | 6/2011 | Nakai et al. |
| 8,044,194 B2 | 10/2011 | Dubois et al. |
| 9,228,058 B2 | 1/2016 | Randall |
| 9,309,218 B2 | 4/2016 | Woelfle et al. |
| 9,550,748 B2 | 1/2017 | Marks et al. |
| 9,617,238 B2 | 4/2017 | Woelfle et al. |
| 9,643,948 B2 | 5/2017 | Putzien et al. |
| 2010/0063104 A1 | 3/2010 | Nakai et al. |
| 2010/0317838 A1 | 12/2010 | Dubois et al. |

(Continued)

FOREIGN PATENT DOCUMENTS

| | | |
|---|---|---|
| EP | 0 001 088 A1 | 3/1979 |
| EP | 0 419 114 A2 | 3/1991 |

(Continued)

OTHER PUBLICATIONS

Haba et al.; Anionic Ring-Opening Polymerization of Methyl 4,6-O-Benzylidene-2,3-O-carbonyl-α-glucopyranoside: A First Example of Anionic Ring-Opening Polymerization of Five-Membered Cyclic Carbonate without Elimination of CO2; Macromolecules 2005, 38, 3562-3563; Mar. 31, 2005. (Year: 2005).*

Endo, et al., "Synthesis and Chemical Recycling of a Polycarbonate Obtained by Anionic Ring-Opening Polymerization of a Bifunctional Cyclic Carbonate", Macromolecules, Sep. 9, 2005, pp. 8177-8182, vol. 36.

European Search Report for EP Patent Application No. 15160420.0. Completed on Jan. 22, 2016.

(Continued)

*Primary Examiner* — Rabon A Sergent
(74) *Attorney, Agent, or Firm* — Curatolo Sidoti Co., LPA; Salvatore A. Sidoti; Floyd Trillis, III

(57) ABSTRACT

The invention relates to a process for producing a ring-opening polymerization product by reacting at least one polyisocyanate and 2-oxo-1,3-dioxolane-4-carboxylic acid and subjecting the reaction product to a temperature within the range of from about 40 to about 150° C. in the presence of a catalytic amount of at least one non-nucleophilic base. The obtained polymerization product may be present as a foam and is suitable as binder, insulation material, sealant or coating and in the production of mattresses or wound pads.

15 Claims, 1 Drawing Sheet

(56) References Cited

U.S. PATENT DOCUMENTS

| | | | |
|---|---|---|---|
| 2011/0054064 A1* | 3/2011 | Fukushima | C08G 64/0208 523/105 |
| 2011/0313177 A1 | 12/2011 | Mecfel-Marczewski et al. | |
| 2014/0191156 A1 | 7/2014 | Marks et al. | |
| 2014/0228583 A1 | 8/2014 | Mecfel-Marczewski et al. | |
| 2014/0235875 A1* | 8/2014 | Hatti-Kaul | C07D 317/36 549/230 |
| 2014/0275309 A1 | 9/2014 | Randall | |
| 2015/0051365 A1 | 2/2015 | Woelfle et al. | |
| 2015/0353521 A1 | 12/2015 | Wölfle et al. | |
| 2016/0096914 A1* | 4/2016 | Hatti-Kaul | C07C 269/04 521/172 |
| 2017/0008871 A1 | 1/2017 | Putzien et al. | |
| 2017/0253687 A1 | 9/2017 | Putzien et al. | |
| 2017/0318811 A1 | 11/2017 | Mecfel-Marczewski et al. | |
| 2017/0320847 A1 | 11/2017 | Vautravers et al. | |

FOREIGN PATENT DOCUMENTS

| | | |
|---|---|---|
| EP | 1 932 840 A1 | 6/2008 |
| EP | 1 941 946 A1 | 7/2008 |
| EP | 2 397 474 A1 | 12/2011 |
| JP | 7-285960 A | 10/1995 |
| JP | 2006003433 A | 1/2006 |
| WO | WO 2004/003001 A1 | 1/2004 |
| WO | WO 2007/040208 A1 | 4/2007 |
| WO | WO 2011/157551 A1 | 12/2011 |
| WO | WO 2012/065879 A1 | 5/2012 |
| WO | WO 2013/028292 A1 | 2/2013 |
| WO | WO 2013/092011 A1 | 6/2013 |
| WO | WO 2013/110512 A1 | 8/2013 |
| WO | WO 2013/127647 A1 | 9/2013 |
| WO | WO 2014/118268 A1 | 8/2014 |
| WO | WO 2014/145732 A1 | 9/2014 |
| WO | WO 2015/132080 A1 | 9/2015 |
| WO | WO 2016/041666 A1 | 3/2016 |
| WO | WO 2016/062424 A1 | 4/2016 |
| WO | WO 2016/071331 A1 | 5/2016 |

OTHER PUBLICATIONS

Haba, et al., "Anionic Ring-Opening Polymerization of Methyl 4,6-O-Benzylidene-2,3-O-carbonyl-α-d-glucopyranoside: A First Example of Anionic Ring-Opening Polymerization of Five-Membered Cyclic CaRbonate without Elimination of $CO_2$", Macromolecules, Mar. 31, 2005, pp. 3562-3563, vol. 38.

Lee, et el., "Ring-Opening Polymerization of Ethylene Carbonate and Depolymerization of Poly(ethylene oxide-co-ethylene carbonate)", Macromolecules, Apr. 2, 2000, pp. 1618-1627, vol. 33, Issue 5.

Soós, et al., "Anionic bulk oligomerization of ethylene and propylene carbonate initiated by bisphenol-A/base systems", Journal of Polymer Science Part A: Polymer Chemistry, 1999, pp. 545-550, vol. 37.

Vogdanis, et al., "Synthetic and thermodynamic investigations in the polymerization of ethylene carbonate", Macromolecular Chemistry and Physics, Mar. 1990, pp. 465-472, vol. 191, Issue 3.

PCT/EP2014/059973—International Search Report, dated Jul. 7, 2014,

PCT/EP2014/059973—International Written Opinion, dated Jul. 7, 2014.

PCT/EP2014/059973—International Preliminary Report on Patentability, dated Dec. 29, 2015.

Tomita, et al., "Model Reaction for the Synthesis of Polyhydroxyurethanes from Cyclic Carbonates with Amines: Substituent Effect on the Reactivity and Selectivity of Ring-Opening Direction in the Reaction of Five-Membered Cyclic Carbonates with Amine", Journal of Polymer Science, 2001, vol. 39, pp. 3678-3685, John Wiley & Sons Inc.

Lewis et al., "Synthesis of L-660,631 Methyl Ester and Related Compounds", Tetrahedron Letters, Jan. 1, 1988, vol. 29, No. 19, pp. 2279-2282, Pergamon Press PLC, Great Britain.

Diakoumakos, Constantino, et al., "Non-Isocyanate-Based Polyurethanes Derived upon the Reaction of Amines with Cyclocarbonate Resins", Macromol. Symp., 2004, vol. 216, pp. 37-46.

Petit, Y., et al., "Ethyl Glycidate From (S)-Serine: Ethyl (R)-(+)-2,3-Epoxypropanoate", Organic Synthesis Collection, 2004, vol. 10, p. 401; Organic Syntheses, 1998, vol. 75, p. 37.

Stevenson, Christian P., et al., "Preparation of (S)-Methyl Glycidate Via Hydrolytic Kinetic Resolution", Organic Syntheses, 2006, vol. 83, pp. 162-169; Organic Syntheses Collection, 2009, vol. 11, pp. 157-163.

Lima, et al., "Bioisosterism: A Useful Strategy for Molecular Modification and Drug Design", Current Medicinal Chemistry, 2005, vol. 12, pp. 23-49, Bentham Science Publishers, Ltd.

PCT/EP2016/068267—International Search Report, dated Oct. 24, 2016.

PCT/EP2016/068267—International Written Opinion, dated Oct. 24, 2016.

PCT/EP2012/072589—International Search Report, dated Jan. 4, 2013.

PCT/EP2012/072589—International Written Opinion, dated Jan. 4, 2013.

PCT/EP2012/072589—International Preliminary Report on Patentability, dated Jun. 24, 2014.

PCT/EP2014/051784—International Search Report, dated Mar. 5, 2014.

PCT/EP2014/051784—International Written Opinion, dated Mar. 5, 2014.

PCT/EP2014/051784—International Preliminary Report on Patentability, dated Aug. 4, 2015.

\* cited by examiner

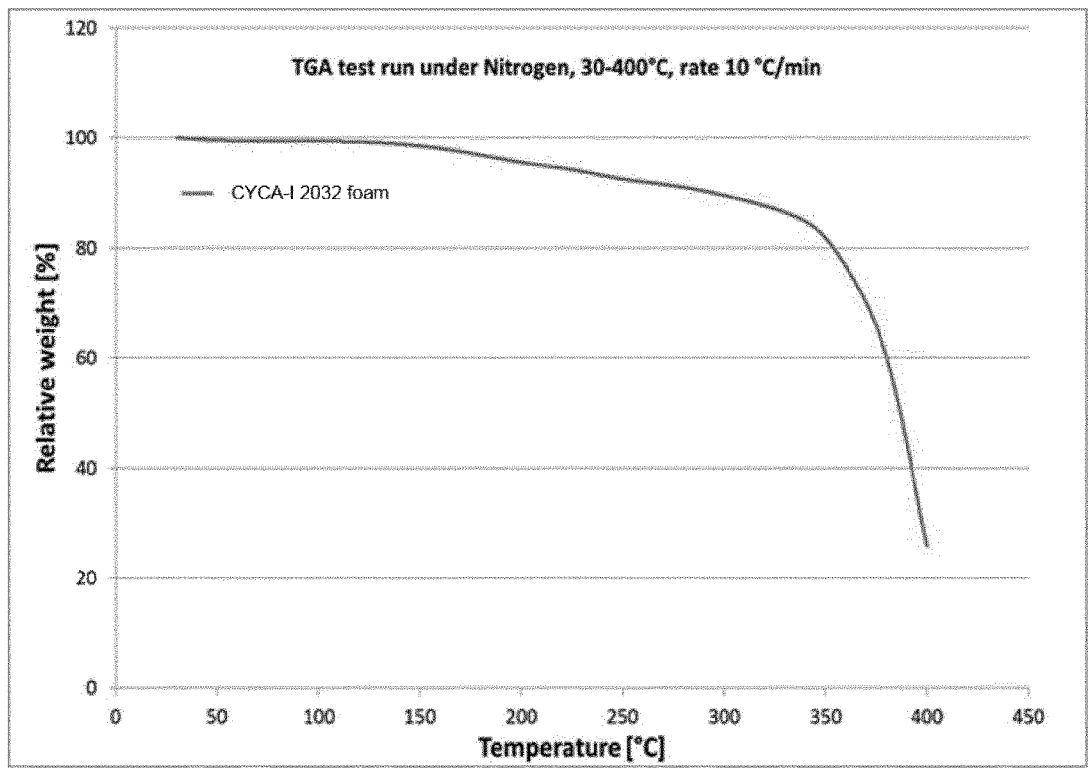

PROCESS FOR PRODUCING A RING-OPENING POLYMERIZATION PRODUCT

CROSS REFERENCE TO RELATED APPLICATIONS

This application is a national stage application of International Application No. PCT/EP2016/068267, filed 1 Aug. 2016, which claims priority from European Patent Application No. 15180420.0, filed 10 Aug. 2015, which applications are incorporated herein by reference.

The invention relates to a process for producing a ring-opening polymerization product, the ring-opening polymerization product obtainable by the process of the invention and the use of the product.

Cyclocarbonate derivatives have recently gained interest as curable binders. WO 2013/092011 discloses 2-oxo-1,3-dioxolane-4-carboxamides that can be used for the preparation of poly(hydroxyurethanes), poly(hydroxycarbonates) and poly(hydroxylsulfanylformates).

WO 2014/118268 discloses 2-oxo-1,3-dioxolane-4-carboxamides wherein the amide nitrogen carries a substituent having one or more isocyanate groups. The compounds are obtained by reacting 2-oxo-1,3-dioxolane-4-carboxylic acid with a polyisocyanate and can be used, for instance, for the preparation of binders.

WO 2013/028292 discloses cyclic carbonate monomers that can be used for preparing poly(hydroxyurethane) foam material.

WO 2014/145732 discloses an article of manufacture formed from the reaction product of at least one plant based polyol and at least one isocyanate free monomer, comprising a foam structure. The isocyanate free monomer may be a cyclic carbonate.

Cyclic carbonates and their ring-opening polymerizations are also the subject of numerous scientific publications:

The anionic ring-opening reaction of non-activated five- and six-membered cyclic carbonates such as 5-(2-oxo-1,3-dioxolan-4-yl)methyl-5-propyl-1,3-dioxan-2-one with DBU was reported by Endo et al. (Macromolecules 2005, 38, 8177-8182). No foaming reaction but polycarbonate formation was observed.

Heitz et al. investigated the polymerization of ethylene carbonate with different catalysts (L. Vogdanis, B. Martens, H. Uchtmann, F. Hensel, W. Heitz, Macromol. Chem. 1990, 191, 465-472). $CO_2$ formation is mentioned but no foams were obtained.

The ring-opening reaction of ethylene carbonate with KOH was examined by Lee et al. (J.-C. Lee, M. H. Litt, Macromolecules 2000, 33, 1618-1627). $CO_2$-evaporation led to linear mixed ethylenecarbonate/ethyleneoxide-polymers. Crosslinking and foaming was not observed.

An anionic ring-opening polymerization of Methyl-4,6-O-Benzylidene-2,3-O-cyrbonyl-α-D-glucopyranoside with DBU was also reported by Endo et al. (O. Haba, H. Tomizuka, T. Endo, Macromolecules 2005, 38, 3562-3563). No $CO_2$ formation was observed.

Zsuga et al. reported the polymerization of ethylene and propylene carbonate in the presence of different bases and bisphenol A (L. Soós, G. Déak, S. Kéki, M. Zsuga, J. Polym. Sci: Part A: Polym. Chem. 1999, 37, 545-550).

The carboxamide compounds disclosed in WO 2013/092011 are cyclic carbonates which are activated by an electron-withdrawing amide group. Their use for the production of cured products has two major disadvantages: a) the production of poly(hydroxyurethanes) requires the use of amine hardeners such as triethylenetetramine, diethylenetriamine etc. as crosslinking components. The use of amines is more and more considered as problematic due to their toxicity; and b) the necessity of using two components which have to be delivered separately and require exact dosing and mixing.

Thus, a one component curing reaction would be highly desirable. The problem underlying the invention is therefore the provision of a polymerization/crosslinking reaction and/or product that can be obtained from the cyclic carbonate component without the use of amine hardeners as a second component.

It was surprisingly found that activated cyclic carbonates can be cured in the presence of catalytic amounts of a strong, non-nucleophilic base such as 1,8-diazabicyclo[5.4.0]undec-7-ene (DBU) without an amine hardener as second component. When the curing reaction is performed at elevated temperatures (>60° C.) a stable soft foam is obtained within one hour.

A first embodiment of the invention is therefore a process for producing a ring-opening polymerization product, which process comprises the steps of:
  a) providing a reaction product of at least one polyisocyanate and 2-oxo-1,3-dioxolane-4-carboxylic acid; and
  b) subjecting said reaction product to a temperature within the range of from 40 to 150° C. in the presence of a catalytic amount of at least one non-nucleophilic base.

The starting materials for and the reaction products of step (a)

Polyisocyanates for preparing the reaction product include all aliphatic, aromatic or cycloaliphatic isocyanates known for the preparation of polyurethanes, or a combination thereof, i.e. mixed aliphatic/aromatic/cycloaliphatic isocyanates, with an —NCO functionality (number of —NCO groups in the molecule) of ≥2, preferably 2 to 6, more preferably 2 to 3.

A small selection of commercially available polyisocyanates includes tetramethylene-1,4-diisocyanate, pentamethylene-1,5-diisocyanate, 2-methylpentamethylene-1,5-diisocyanate, hexamethylene-1,6-diisocyanate (HDI), 2,2,4- and 2,4,4-trimethylhexamethylene-1,6-diisocyanate (TMDI), dodecamethylene-1,12-diisocyanate, lysine diisocyanate and lysine ester diisocyanate, 1-isocyanato-3,3,5-trimethyl-5-isocyanatomethylcyclo-hexane (isophorone diisocyanate—IPDI), 1,4-diisocyanato-2,2,6-trimethylcyclo-hexane (TMCDI), 2,2'-, 2,4'- and 4,4'-dicyclohexylmethane diisocyanate ($H_{12}$MDI), cyclohexane-1,3-diisocyanate and cyclohexane-1,4-diisocyanate (CHDI), 1,3- and 1,4-bis(isocyanatomethyl)cyclohexane, 4,4'-diisocyanatodicyclohexyl-2,2-propane, m- and p-phenylene diisocyanate, 2,3,5,6-tetramethyl-1,4-diisocyanatoben-zene, 3,3'-dimethyl-4,4'-diisocyanatodiphenyl (TODD, 2,4- and 2,6-toluylene diisocyanate, 2,2'-, 2,4'- and 4,4'-diphenylmethane diisocyanate (MDI), naphthalene 1,2-diisocyanate and naphthalene 1,5-diisocyanate (NDI), m- and p-xylylene diisocyanate (XDI), tetramethylxylylene diisocyanate (TMXDI), HDI trimer, polymeric MDI, and mixtures thereof. A preferred polyisocyanate is isophorondiisocyanate and/or 2,4-toluylene diisocyanate (TDI) and/or 2,6-toluylene diisocyanate.

Polyisocyanates can also be used in form of polyisocyanate prepolymers. Said polyisocyanate prepolymers are obtainable by reacting a molar excess of a polyisocyanate as defined above, for example at temperatures of from 20 to 100° C., preferably at about 80° C., with a polyol.

The term "molar excess" as defined herein means that the molar ratio of the NCO groups of the polyisocyanate to the OH groups of the polyol (or to the COOH groups of the acid as used hereinbelow) is greater than 1.1, preferably greater than 1.2. The reaction is carried out as known in the art. For example, an inert solvent may be used such as tetrahydrofuran. Further, catalysts that are usually used for polyurethane preparation such as amine compounds and organometallic compounds like dibutyl tin dilaurate may be used. The NCO content of the polyisocyanate prepolymers is preferably from 2 to 32 wt.-% NCO, more preferably from 2 to 15 wt.-% NCO. Moreover, the polyisocyanate prepolymer preferably has a number average molecular weight (Mn) in the range from about 500 to 10000, preferably 1000 to 8000.

Suitable polyols for the preparation of the polyisocyanate prepolymers are known in the art and described for example in "Plastics Handbook, Volume 7, "Polyurethane", Carl Hanser Verlag, 3rd Edition 1993, Chapter 3.1. As polyols, polyether polyols, polycarbonate polyols or polyester polyols, preferably polyether polyols, may be used. Generally, the polyol may have an average OH functionality of 2 to 8, more preferably 2 to 6 and in particular 2 or 3.

Moreover, the polyol may have a number average molecular weight (Mn) of at least 350, preferably at least 400 and in particular at least 500 g/mole. In general, the number average molecular weight is not higher than 15000 g/mole. Preferably, the number average molecular weight is from 400 to 10000, in particular 500 to 4000 g/mole.

The number average molecular weights are determined by using the OH number according to DIN 53240 and applying the formula $M_n = Fn \cdot 1000 \cdot 56.1/OH$ number. The functionality applied is the nominal functionality. The OH number of these compounds is usually in the range of 20 to 850 mg KOH/g, preferably in the range of 30 to 400 mg KOH/g.

The polyether polyols may be obtained by known methods, for example by anionic or cationic polymerization of alkylene oxides with at least one initiator molecule containing 2 to 8, preferably 2 to 6, reactive hydrogen atoms, in the presence of catalysts. As alkylene oxides one or more compounds having 2 to 4 carbon atoms in the alkylene radical may be used, for example ethylene oxide, tetrahydrofuran, 1,2-propylene oxide, 1,3-propylene oxide, 1,2- or 2,3-butylene oxide, in each case alone or in the form of mixtures, preferably used is ethylene oxide or 1,2-propylene oxide. The polyether polyols are preferably poly-$C_{2-4}$-alkylenoxides having a number average molecular weight (Mn) in the range of from 400 to 10000.

As starter molecules compounds such as ethylene glycol, diethylene glycol, glycerol, trimethylolpropane, pentaerythritol, sugar derivatives such as sucrose, hexite derivatives such as sorbitol, methylamine, ethylamine, isopropylamine, butylamine, benzylamine, aniline, toluidine, toluene diamine, especially 1,2-toluene diamine, naphthylamine, ethylenediamine, diethylenetriamine, 4,4'-methylenedianiline, 1,3-propanediamine, 1,6-hexane diamine, ethanolamine, diethanolamine, triethanolamine and other two or polyhydric alcohols or one or polyhydric amines may be used. The polyester polyols used are usually prepared by condensation of polyfunctional alcohols having 2 to 12 carbon atoms, such as ethylene glycol, diethylene glycol, butanediol, trimethylolpropane, glycerol or pentaerythritol, with polyfunctional carboxylic acids having 2 to 12 carbon atoms, such as succinic acid, glutaric acid, adipic acid, azelaic acid, sebacic acid, decanedicarboxylic acid, maleic acid, fumaric acid, phthalic acid, isophthalic acid, terephthalic acid, the isomers of naphthalenedicarboxylic acids or the anhydrides of the above acids. The polyester polyols used for example have an OH functionality of from 1.5 to 5, preferably from 1.8-3.5.

Also polyether polyol/polyester polyol-hybrids as described in WO 2013/127647 and WO 2013/110512 may be applied as polyols.

For the preparation of the reaction product (a) two methods can be used:

(1) The polyisocyanate can be reacted with an equimolar amount of 2-oxo-1,3-dioxolane-4-carboxylic acid. The term "equimolar" as used herein means that the molar ratio of the NCO groups of the polyisocyanate to the COOH groups of the 2-oxo-1,3-dioxolane-4-carboxylic acid is "essentially" equal to 1 (i.e. 0.95-1.05). The obtained reaction product is of formula (I):

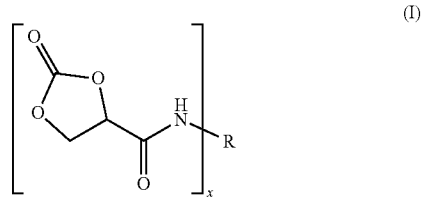

wherein R is an x-valent radical derived from said polyisocyanate by formally removing the NCO groups and x is an integer from 2 to 6, preferably 2 or 3.

For the purpose of the present invention, the term "x-valent radical" generally means that R is a group which is substituted with x substituents. In other words, R is a group which has a valence of "x". Preferably, x is an integer from 2 to 3. The reaction product (a) has essentially no free isocyanate groups. The term "essentially" as used herein means an NCO value of less than 3 wt.-%, preferably less than 1 wt.-% and in particular 0 wt.-%.

(2) Alternatively, a molar excess of the polyisocyanate can be reacted in a first step with 2-oxo-1,3-dioxolane-4-carboxylic acid to obtain an intermediate, and in a second step the intermediate is reacted with a polyol as defined hereinabove. The term "molar excess" and the reaction conditions of the reaction with the polyol are as defined hereinabove. Again, the reaction product of step (a) has essentially no free isocyanate groups and generally also falls under formula (I). The "intermediate" is a compound as defined in claim 1 of WO 2014/118268 A1.

Production of the ring-opening polymerization product in step (b)

The reaction product of step (a) is reacted by subjecting it to a temperature in the range of from about 40 to about 150° C., preferably 60 to 150° C., in the presence of a catalytic amount of a non-nucleophilic base to give the product by a ring-opening polymerization.

The non-nucleophilic base can be selected from 1,8-diazabicyclo[5.4.0]undec-7-ene, 1,5-diazobicyclo[4.3.0] non-5-ene, 1,4-diazabicyclo[2.2.2]octane, 2,6-di-tert-butylpyridine, diisopropylethylamine, triazabicyclodecene, tetramethylguanidine, imidazole, dimethylaminopyridine, lithium diisopropylamide, lithium tetramethylpiperidide, sodium t-butylate, potassium t-butylate, sodium hydride, potassium hydride etc. or mixtures thereof. Preferred are the diazabicyclo compounds, in particular 1,8-diazabicyclo [5.4.0]undec-7-ene, and tetramethylguanidine.

Moreover, the non-nucleophilic base can be used in an amount of 0.1 to 5 wt.-%, preferably 0.5 to 4 wt.-%, based on the weight of the reaction product of step (a).

A second embodiment of the present invention relates to a ring-opening polymerization product obtainable by the process of the invention as defined hereinabove.

The ring-opening polymerization product may be in the form of a foam, in particular an open-cell foam.

When a ring-opening polymerization is initiated and carbon dioxide is cleaved off, a ring-opening polymerization product is obtained. In a preferred embodiment the polymerization is carried out at a temperature in the range from about 60° C. to about 150° C. resulting in a highly cross-linked spatial network which due to the development of carbon dioxide is a stable foam. The ring-opening polymerization product and in particular the foam is built up of repeating units of the following formulae (IIa) and (IIb)

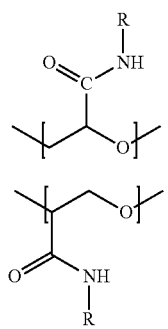

wherein R is as defined above for formula (I).

A third embodiment of the present invention relates to a composition comprising the reaction product of step (a) and the non-nucleophilic base as defined hereinabove.

That composition may be in the form of a kit of parts, wherein one part comprises the reaction product of step (a) and another part comprises the non-nucleophilic base.

Moreover, the present invention relates to an article obtainable from the foam or the composition of the present invention.

A further embodiment of the present invention relates to the use of the ring-opening polymerization product, in particular the foam, or of the composition as defined hereinabove, as or for the production of a construction material, in particular a binder, insulation material, sealant, or coating.

A further embodiment of the present invention relates to the use of the ring-opening polymerization product or of the composition of the invention for the production of mattresses or wound pads.

Finally, a further embodiment of the present invention relates to the use of 2-oxo-1,3dioxolane-4-carboxylic acid and/or of the reaction product of step (a) of formula (I) for foam production.

The following examples illustrate the invention without limiting it.

FIG. 1 shows a thermogravimetric scan of a product according to the invention.

EXAMPLES

The following abbreviations and products are used in the examples:
CYCA: 2-oxo-1,3-dioxolane-4-carboxylic acid
IPDI: isophorondiisocyanate
DBTL: dibutyl tin dilaurate
DMAP: 4-dimethylaminopyridine
THF: tetrahydrofuran
RT: room temperature
Lupranol® 2032: commercial product of BASF SE; trifunctional polyetherpolyol with
   OH number of 55 mg KOH/g and $M_n$=3060 g/mole
Lupranol® 2095: commercial product of BASF SE; trifunctional polyetherpolyol with
   OH number of 35 mg KOH/g and $M_n$=4800 g/mole
DBU: 1,8-diazabicyclo[5.4.0]undec-7-ene
TGA: thermogravimetric analysis
TDI: toluylene-2,4-diisocyanate
HDI: hexamethylene-1,6-diisocyanate
Arcol® Polyol 1374: commercial product of Bayer; trifunctional polyetherpolyol with
   OH number of 25-29 mg KOH/g and $M_{eq}$=2078 g/mole
Desmodur® N3600: commercial product of Bayer; polyfunctional aliphatic polyisocyanate, i.e. HDI trimer; NCO content 23.5±0.5%

Example 1

Preparation of
4-methoxycarbonyl-2-oxo-1,3-dioxolane
(Reference)

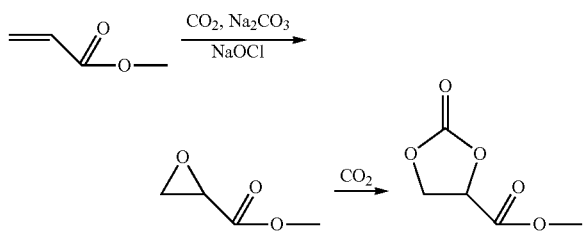

80 g of sodium carbonate were dissolved in 200 ml of distilled water in a 1000 ml three-neck flask. The solution was cooled to 10° C. 58.5 g of methyl acrylate were then added and, after ca. 10 minutes, likewise at 10° C., 400 ml of a 7% strength aqueous sodium hypochlorite solution were stirred in. Then, the system was immediately flushed intensively with $CO_2$. The temperature was allowed to increase to room temperature. The flask was flushed intensively with $CO_2$ for a further 1 h at about 25 to 30° C., during which the temperature was held in the stated range by means of occasional cooling with an ice bath. The resulting white solid was filtered off via a suction filter. The filtrate was extracted with 4×90 ml of dichloromethane. The combined organic phase was dried with sodium sulfate and filtered off. The filtrate was removed on a rotary evaporator. Methyl epoxypropionate was obtained in 50 to 60% yield and a purity of 97%.

20 g of the methyl epoxypropionate were mixed with 20 g of tert.-butyl methyl ether and 1 g of tetrabutylammonium bromide. The homogeneous mixture was transferred to a 100 ml pressurized reactor and carboxylated for 4 days at 40° C. and a $CO_2$ pressure of 20 bar. After the carboxylation, a two-phase system was obtained; the upper phase consisted of tert-butyl methyl ether, and the lower phase consisted of 4-methoxycarbonyl-2-oxo-1,3-dioxolane (purity 94% (GC), yield 94%).

Example 2

Aerobic Oxidation of Glycerol Carbonate (Reference)

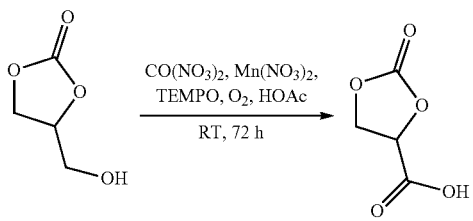 [SMILES: O=C1OCC(CO)O1 ; O=C1OCC(C(=O)O)O1]

11.81 g (0.1 mole) of glycerol carbonate (4-(hydroxymethyl)-2-oxo-1,3-dioxolane), 0.50 g (0.002 mole) of manganese (II) nitrate tetrahydrate ($Mn(NO_3)_2 \cdot 4\ H_2O$), 0.58 g (0.002 mole) of cobalt (II) nitrate hexahydrate ($Co(NO_3)_2 \cdot 6\ H_2O$) and 1.88 g (0.012 mole) of TEMPO (2,2,6,6-tetramethylpiperidin-1-oxyl) were dissolved in 100 ml of acetic acid. The reddish solution was stirred for 72 hours at room temperature under an oxygen atmosphere, evaporated to dryness, and the crude product was purified by recrystallization. This gave 2-oxo-1,3-dioxolane-4-carboxylic acid in the form of white to yellowish crystal needles. The yield was about 75%, and the analytical data were in agreement with known data.

Additional examples for preparing the compounds of examples 1 and 2 are given in WO 2014/118268.

Example 3

CYCA-I 2032, a Binder System Based on CYCA, IPDI and Lupranol 2032 can be Cured in the Presence of 3 wt.-% of DBU to Give a Yellowish Foam within 1 h at 100° C.

3.1 Preparation of Prepolymer CYCA-I 2032

Under an atmosphere of $N_2$, 91.80 g Lupranol 2032 (0.03 mole), 20.01 g IPDI (0.09 mole) and 0.022 g DBTL in 250 mL of dry THF were heated to 60° C. and stirred for 1.25 h until the desired NCO value of 3.0% was reached. The reaction mixture was allowed to cool to RT and 10.70 g CYCA (according to the final NCO value of 3.0%) and 0.10 g DMAP were added and the reaction mixture was stirred for 12 h until no residual NCO could be found anymore (IR control). The solvent was removed in vacuo and the binder was obtained as highly viscous yellowish oil in quantitative yield.

3.2 1 K-Curing of CYCA-I 2032

12.0 g CYCA-I 2032 and 0.36 g (3 wt.-%) DBU were vigorously mixed in a plastic beaker and heated to 100° C. in a drier for 1 h. A yellowish soft foam was obtained. The foam was insoluble in most common organic solvents such as THF, dimethylsulfoxide, acetone, toluene and water. In some cases swelling was observed.

IR (v, cm-1): 3312 (bm), 2969 (m), 2928 (m), 2866 (m), 1714 (w), 1648 (m), 1603 (w), 1532 (w), 1453 (m), 1372 (m), 1343 (w), 1324 (w), 1303 (w), 1241 (w), 1094 (s), 1014 (w), 925 (m), 868 (w), 766 (w).

The stability of the foam was examined via TGA under $N_2$ (FIG. 1). Decomposition starts at approx. 150° C. and strongly increases at 350° C.

Example 4

CYCA-T 2095, a Binder System Based on CYCA, TDI and Lupranol 2095 can be Cured at Slightly Elevated Temperature in the Presence of 1 wt.-% of DBU to Give a Yellowish Elastic Foam within 1 h 4.1 Preparation of Prepolymer CYCA-T 2095

Under an atmosphere of $N_2$, 584.76 g Lupranol 2095 (0.36 mole OH), 100.0 g of TDI-CYCA intermediate (15.35% NCO, 0.36 mole NCO; obtained in analogy to example 11 or 12 of WO 2014/118268) and 0.09 g DBTL were mixed in a flask, heated to 60° C. and stirred until no residual NCO was found (approx. 6 h, IR control). The reaction mixture was cooled to RT and the binder was obtained as viscous yellowish oil in quantitative yield.

4.2 Curing of CYCA-T 2095

12.0 g CYCA-T 2095 and 0.12 g (1 wt.-%) DBU were mixed in a plastic beaker and allowed to cure at 80° C. for 1 h. A yellowish, stable elastic foam was obtained.

Example 5

CYCA-T 1374, a Binder System Based on CYCA, TDI and Arcol Polyol 1374 can be Cured at Slightly Elevated Temperature in the Presence of 3 wt.-% of DBU to Give a Yellowish Elastic Film 5.1 Preparation of CYCA-T 1374

Under an atmosphere of $N_2$, 211.38 g Arcol Polyol 1374 (0.10 mole OH) were dissolved in 750 mL of dry THF. 27.98 g of TDI-CYCA intermediate (15.27% NCO, 0.10 mole NCO; obtained in analogy to example 11 or 12 of WO 2014/118268) and 0.06 g DBTL were added. The reaction mixture was heated to 60° C. until no residual NCO was found (approx. 6 h, IR control). The reaction mixture was cooled to RT and the solvent was removed in vacuo. The pure binder was obtained as highly viscous yellowish oil in quantitative yield.

5.2 Curing of CYCA-T 1374

12.0 g CYCA-T 1374 and 0.36 g (3 wt.-%) DBU were mixed in a plastic beaker and allowed to cure at 40° C. for 1 h. A yellowish, stable elastic film was obtained.

IR (v, cm-1): 3267 (vw), 2968 (m), 2866 (m), 1703 (w), 1648 (w), 1615 (w), 1534 (w), 1453 (m), 1373 (m), 1344 (w), 1296 (w), 1241 (w), 1093 (s), 926 (m), 870 (w), 832 (w), 769 (w).

Example 6

CYCA-H 9046 (TRICYCA), a Binder System Based on CYCA and Desmodur N 3600 (HDI-isocyanurate) can be Cured in the Ppresence of 1 wt.-% DBU 6.1 Preparation of CYCA-H 9046 (TRICYCA)

Under an atmosphere of $N_2$, 78.21 g Desmodur N 3600 (0.43 mol NCO), 57.28 g cyclic carbonate carboxylic acid (CYCA) (0.43 mole) and 0.52 g 4-DMAP were diluted with 400 mL of dry THF and the reaction mixture was stirred at RT until no residual NCO was found (approx. 6h, IR control). The solvent was removed in vacuo and the pure binder was obtained as yellowish viscous liquid in quantitative yield.

6.2 Curing of CYCA-H 9046 (TRICYCA)

12.0 g CYCA-H 9046 and 0.12 g (1 wt.-%) DBU were mixed in a plastic beaker and allowed to cure at 80° C. for 1 h. A brownish, hard and brittle, porous material was obtained.

Example 7

N3600-GC, a Binder System Based on Glycerol Carbonate and Desmodur N3600 (HDI-isocyanurate) (Comparative Example to Example 6)

7.1 Preparation of N3600-GC

Under an atmosphere of N2, 320.39 g Desmodur N 3600 (1.72 mole NCO), 202.78 g glycerol carbonate (1.72 mole) and 0.1 g DBTL were diluted with 600 mL of dry THF and the reaction mixture was heated to 60° C. until no residual NCO was found (approx. 6 h, IR control). The reaction mixture was cooled to RT and the solvent was removed in vacuo. The pure binder was obtained as clear viscous liquid in quantitative yield.

7.2 Curing of N3600-GC 12.0 g N3600-GC and 0.12 g (1 wt.-%) DBU were mixed in a plastic beaker and allowed to react at 80° C. for 1 h. No curing and no foaming was observed and a clear viscous liquid was obtained.

In contrast to the examples of the invention, the cyclic carbonate of this binder is not activated by an electron-withdrawing group. In this case, no curing and foaming reaction was observed.

Example 8

T-2095-GC, a Binder System Based on Glycerol Carbonate, TDI and Lupranol 2095 (Comparative Example to Example 4)

8.1 Preparation of T-2095-GC

Under an atmosphere of $N_2$, 211.2 g Lupranol 2095 ($M_{eq}$=1600 g/mol, 0.13 mol OH) were diluted with 350 mL of dry THF, 23.00 g TDI (48.2% NCO, 0.13 mole) were added and the reaction mixture was heated to 50° C. for 20 min. The NCO content was determined and the corresponding amount of glycerol carbonate (16.92 g, 0.14 mole) was added as well as 0.04 g (0.02 wt.-%) of DBTL. The reaction mixture was stirred at RT for 8 h and after removal of the solvent the binder was obtained as viscous clear oil in quantitative yield.

8.2 Curing of T-2095-GC 12.0 g T-2095-GC and 0.12 g (1 wt.-%) DBU were mixed in a plastic beaker and allowed to react at 80° C. for 3d. No curing and foaming was observed and a turbid brownish liquid was obtained.

The invention claimed is:

1. A process for producing a ring-opening polymerization product in the form of an open-cell foam which comprises the steps of:
   a) providing a reaction product of at least one polyisocyanate and 2-oxo-1,3-dioxolane-4-carboxylic acid; and
   b) subjecting said reaction product to a temperature within the range of from 40 to 150° C. in the presence of a catalytic amount of at least one non-nucleophilic base, wherein carbon dioxide is cleaved off.

2. The process of claim 1, wherein the polyisocyanate is selected from an aliphatic isocyanate, an aromatic isocyanate, a cycloaliphatic isocyanate, or a combination thereof, having an —NCO functionality of ≥2.

3. The process of claim 1, wherein the polyisocyanate is selected from toluylenediisocyanate, isophorondiisocyanate, diphenylmethanediisocyanate, 4,4'-diisocyanato-dicyclohexylmethane, tetramethylenediisocyanate, pentamethylenediisocyanate, hexamethylene-diisocyanate, and mixtures thereof.

4. The process of claim 1, wherein the polyisocyanate is a polyisocyanate prepolymer which is obtained by reacting a molar excess of a polyisocyanate with a polyol, wherein the polyisocyanate:
   i.) is selected from an aliphatic isocyanate, an aromatic isocyanate, a cycloaliphatic isocyanate, or a combination thereof, having an —NCO functionality of ≥2; or
   ii.) is selected from toluylenediisocyanate, isophorondiisocyanate, diphenylmethanediisocyanate, 4,4'-diisoyanatodicyclohexylmethane, tetramethylene diisocyanate, pentamethylenediisocyanate, hexamethylenediisocyanate, and mixtures thereof.

5. The process of claim 4, wherein the polyol has an average OH functionality of 2 to 8.

6. The process of claim 5, wherein the polyol is a poly-$C_{2-4}$-alkylenoxide having a number average molecular weight Mn in the range of from 400 to 10000.

7. The process of claim 1, wherein the reaction product of step (a) is obtained by:
   (1) reacting the polyisocyanate with an equimolar amount of 2-oxo-1,3-dioxolane-4-carboxylic acid; or by
   (2) reacting in a first step a molar excess of the polyisocyanate with 2-oxo-1,3-dioxolane-4-carboxylic acid to obtain an intermediate, and in a second step reacting the intermediate with a polyol, wherein the polyol has an average OH functionality of 2 to 8.

8. The process of claim 7, wherein the polyol is a poly-$C_{2-4}$-alkylenoxide having a number average molecular weight Mn in the range of from 400 to 10000.

9. The process of claim 1, wherein the reaction product of step (a) is of formula (I)

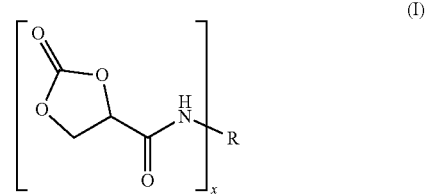

wherein R is an x-valent radical derived from said polyisocyanate by formally removing the NCO groups and x is an integer from 2 to 6.

10. The process of claim 1, wherein step (b) is carried out at a temperature in the range of from 60 to 150° C.

11. The process of claim 1, wherein the non-nucleophilic base is selected from 1,8-diazabicyclo[5.4.0]undec-7-ene, 1,5-diazobicyclo[4.3.0]non-5-ene, 1,4-diazabicyclo[2.2.2]octane, 2,6-di-tert-butylpyridine, diisopropylethylamine, tetramethylguanidine or mixtures thereof.

12. A process for producing a ring-opening polymerization product in the form of an open-cell foam which comprises the steps of:
   a) providing a reaction product of at least one polyisocyanate and 2-oxo-1,3-dioxolane-4-carboxylic acid; and b) subjecting said reaction product to a temperature within the range of from 40 to 150° C. in the presence of a catalytic amount of at least one non-nucleophilic base, wherein carbon dioxide is cleaved off;

wherein the reaction product of step (a) is obtained by: (1) reacting the polyisocyanate with an equimolar amount of 2-oxo-1,3-dioxolane-4-carboxylic acid; or by (2) reacting in a first step a molar excess of the polyisocyanate with 2-oxo-1,3-dioxolane-4-carboxylic acid to obtain an intermediate, and in a second step reacting the intermediate with a polyol; and wherein the polyol has an average OH functionality of 2 to 8; wherein the polyol is a poly-$C_{2-4}$-alkylenoxide having a number average molecular weight Mn in the range of from 400 to 10000.

13. A ring-opening polymerization product in the form of an open-cell foam obtained by the process of claim 1.

14. The product of claim 13, wherein the polyisocyanate:
i.) is selected from an aliphatic isocyanate, an aromatic isocyanate, a cycloaliphatic isocyanate, or a combination thereof, having an —NCO functionality of ≥2; or
ii.) is selected from toluylenediisocyanate, isophorondiisocyanate, diphenylmethanediisocyanate, 4,4'-diisocyanatodicyclohexylmethane, tetramethylene diisocyanate, pentamethylenediisocyanate, hexamethylenediisocyanate and mixtures thereof.

15. The product of claim 13, wherein the non-nucleophilic base is selected from 1,8-diazabicyclo[5.4.0]undec-7-ene, 1,5-diazobicyclo[4.3.0]-non-5-ene, 1,4-diaza bicyclo[2.2.2]octane, 2,6-di-tert-butylpyridine, diisopropylethylamine, tetramethyl guanidine or mixtures thereof.

* * * * *